United States Patent [19]
Fischer

[11] 3,873,122
[45] Mar. 25, 1975

[54] AUTOMATIC LEVELLING ARRANGEMENT FOR VEHICLES AND THE LIKE

[76] Inventor: Friedhelm Fischer, Letmather Strasse 25, 5845 Villigst, Germany

[22] Filed: July 25, 1973

[21] Appl. No.: 382,565

[30] Foreign Application Priority Data
July 25, 1972 Germany............................ 2236402

[52] U.S. Cl............................................. 280/124 F
[51] Int. Cl............................................. B60g 17/04
[58] Field of Search.... 280/6.1, 6 H, DIG. 1, 124 F; 267/34, 65 D

[56] References Cited
UNITED STATES PATENTS

| | | | |
|---|---|---|---|
| 2,962,296 | 11/1960 | Jackson et al.................. | 280/124 F |
| 2,989,322 | 6/1961 | Hrebicek........................ | 280/124 F |
| 3,166,340 | 1/1965 | Rusconi........................ | 280/6 H X |
| 3,633,935 | 1/1972 | Boyer............................ | 280/124 F |

Primary Examiner—Robert B. Reeves
Assistant Examiner—Joseph J. Rolla
Attorney, Agent, or Firm—Michael S. Striker

[57] ABSTRACT

A distance regulating arrangement controls the distance between two components that are to be subjected to varying forces tending to change the distance between the components and varying within a predetermined range of forces having a lower and an upper limit, and in particular controls the distance between the axle and the chassis of a vehicle subjected to varying weight loads. The arrangement includes a linkage connecting together the two components and including a first portion connectable to one of the two components, and a second portion connectable to the other of the two components and movable relative to the first portion of the linkage in a predetermined direction. A control arrangement is operative, when a loading force intermediate a first value higher than the lower limit and a second value lower than the upper limit is applied to the portions and tends to change the distance therebetween, for automatically developing a resisting force equal to the loading force and for maintaining a predetermined distance between the portions, but is operative when the loading force is intermediate the lower limit and the first value or intermediate the upper limit and the second value for automatically developing a resisting force equal to the loading force while permitting a change in the distance between the portions as a function of the loading force.

13 Claims, 5 Drawing Figures

AUTOMATIC LEVELLING ARRANGEMENT FOR VEHICLES AND THE LIKE

BACKGROUND OF THE INVENTION

The invention relates to automatic distance and level regulating arrangements, for instance of the type employed to control the elevation of the chassis of an automotive vehicle relative to the axles thereof in response to variations in the weight carried by such vehicle chassis.

I have considered the possibility of employing automatic elevation controlling arrangements for both the front and rear axles of a vehicle, for automatic control of the elevation of the vehicle chassis. I have in particular considered the use of hydropneumatic shock absorbers capable of providing an elevation correction, used in combination with a pump for supplying hydraulic fluid, such as oil, to the shock absorber, to increase the internal pressure in the shock absorber, together with an outflow conduit communicating with the interior of the hydropneumatic shock absorber for permitting the flow of hydraulic fluid out of the shock absorber into a fluid reservoir.

Specifically, I have considered connecting a pressure-responsive device in the conduit leading from the pump to the shock absorber, to place a limit on the amount of pressure permitted to build up in the shock absorber, either by automatic termination of pump operation or else by closing off the conduit leading from the pump to the valve, or in other suitable manner. I have furthermore considered connecting a pressure-responsive device in the fluid outflow conduit leading out of the shock absorber, to place a lower limit on the extent to which the fluid pressure in the shock absorber should be allowed to fall during the course of an automatic level-regulating operation. This second low-pressure-responsive device could be operative to suitably block the fluid outflow conduit to prevent further flow of pressure fluid out of the shock absorber when the fluid pressure drops below a predetermined value. The aforementioned high-pressure-responsive device shuts off the electric motor for the pump or else closes off a valve to prevent further build-up of shock absorber pressure, when upon completion of the chassis-raising corrective action the supply of fluid to the shock absorber is terminated by the automatic elevation regulating system. The aforementioned low-pressure-responsive device closes off a valve, to prevent further outflow of fluid from the shock absorber, when upon completion of the chassis-lowering corrective action the outflow of fluid from the shock absorber is terminated by the automatic elevation regulating system. According to this concept, the high-pressure-responsive device must be set for a threshold pressure which is above the maximum pressure which must be developed by the shock absorber in response to maximum loading, and the threshold pressure of the low-pressure-responsive device must be set to a value below the minimum pressure which the shock absorber must be capable of developing.

The above-described approach brings with it certain significant disadvantages. This is particularly the case when only one end of a vehicle chassis is provided with an automatic chassis-elevation regulating system, with the other end of the chassis being merely provided with simple resilient mounting means of conventional nature. Because the elevation of only one end of the vehicle chassis is automatically maintained constant, annoying and even dangerous discrepancies can arise between the elevation of the two ends of the chassis. For example, in cars having engines in the rear and luggage compartments in front, it is possible to automatically maintain constant the elevation of only the front end of the chassis, because the variations in loading, due both to cargo and passengers, will be greater at the front than at the rear end of the vehicle. Thus, if the trunk is fully loaded and if furthermore the passenger compartment is fully loaded, the elevation of the rear end of the chassis will be low, because of the very heavy loading, but the elevation of the front end of the chassis will be at the normal elevation corresponding to no cargo and no passengers, because of the automatic elevation-control system. As a result, the vehicle will become tilted in such a manner as to cause the beam projected by the vehicle headlights to be aimed in a direction other than the intended direction, with the result, for example, that drivers of oncoming vehicles may become momentarily blinded if the headlight beam of the tilted vehicle is projected almost directly into their eyes. This tilting can be so great as to cause this difficulty even when the headlights are operating in the short-beam mode.

SUMMARY OF THE INVENTION

It is the general object of the present invention to overcome the above-described disadvantages.

It is a more specific object of the invention to provide an automatic distance-regulating arrangement, usable as an automatic chassis-elevation control arrangement for a vehicle, having such characteristics as will overcome the above-described disadvantages.

It is a still more specific object to provide an automatic chassis-elevation control arrangement for vehicles which can be provided for only a single one of the two ends of the vehicle chassis, but which nevertheless controls the elevation of such single end in a manner taking into account presumed changes of the elevation of the other end of the chassis, so as to prevent the development of excessive discrepancies between the elevations of the two chassis ends, notwithstanding the fact that only one end of the chassis is provided with an automatic elevation-control system.

This object, and others which will become more understandable from the following description of a specific embodiment, can be met according to one concept of the present invention by providing a distance-regulating arrangement for controlling the distance between two components that are to be subjected to varying forces tending to change the distance between the components and varying within a predetermined range of forces having a lower and an upper limit, particularly for controlling the distance between an axle and the chassis of a vehicle subjected to varying weight loads. The arrangement includes linkage means connecting together the two components and including a first portion connected to one of the two components, and a second portion connected to the other of the two components and movable relative to the first portion of the linkage means in a predetermined direction. The arrangement further includes control means, operative, when a loading force intermediate a first value higher than said lower limit and a second value lower than said upper limit is applied to said portions and tends to change the distance therebetween, for automatically developing a resisting force equal to the loading force and for maintaining a predetermined distance between said portions. However, when the loading force is intermediate said lower limit and said first value or intermediate said upper limit and said second value, the control means is operative for automatically developing a resisting force equal to the loading force while permitting a change in the distance between the two portions of the linkage means as a function of the loading force.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
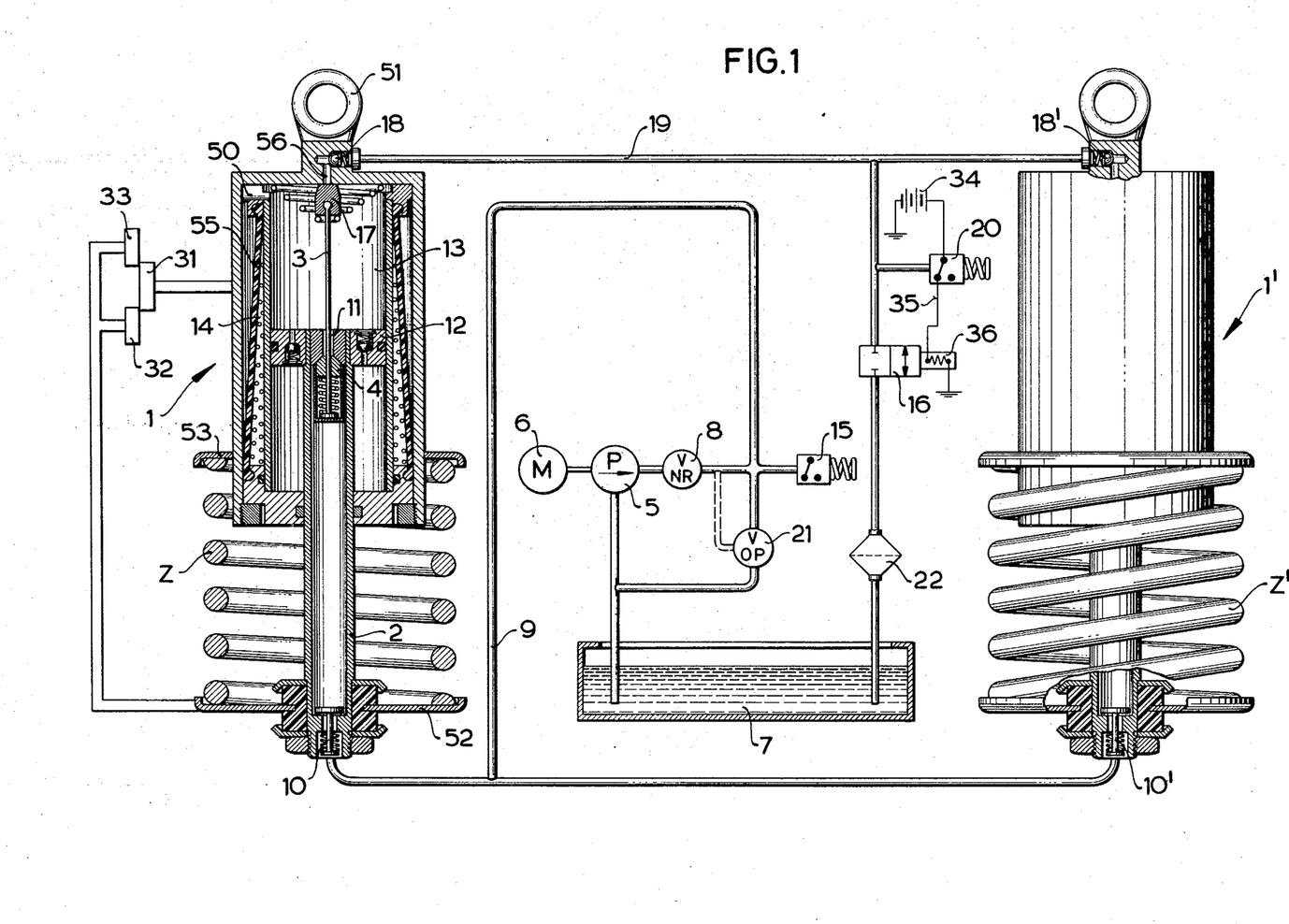
FIG. 1 illustrates an exemplary distance-regulating system according to the invention, in the form of a combined shock absorber and chassis-elevation regulating system for a vehicle.

FIG. 1 shows a combined shock-absorber and chassis-elevation regulating system for an automotive vehicle. Reference numeral 1 designates in general a linkage system comprised of an upper portion 51 connectable to the chassis of a vehicle and a lower portion 52 connectable to an axle of the vehicle. Linkage arrangement 1 is comprised of a hydraulic cylinder-and-piston unit which includes a hydraulic piston 12 mounted on the end of a piston rod 2. Piston 12 is guided for movement in vertical direction through the interior of the illustrated hydraulic cylinder.

Furthermore, the cylinder of the cylinder-and-piston unit is provided with a support flange 53, whereas the piston of the cylinder-and-piston unit is provided with a support flange 52. These flanges 52 and 53 serve to mount a compression spring Z forming part of the shock absorber arrangement.

Surrounding the radially innermost cylinder of the cylinder-and-piston unit is a sealed annular chamber 14 filled with a gas. The gas is trapped between the outer periphery of the innermost cylinder of the arrangement and a tubular diaphragm 55. The inherent ability of this gas-filled chamber to become more or less compressed causes it to perform as a spring, and the combined action of this gas spring and that of the illustrated compression spring Z provides the springiness for the shock absorber.

The operation of the system, insofar as it performs as a simple shock absorber, is as follows:

If the vehicle wheel associated with shock absorber 1 passes over a bump (elevation) in the road surface, there is a momentary increase of the force tending to reduce the distance between the portion 51 connected to the chassis and the portion 52 connected to the axle. This force is such as to cause the piston 12 to penetrate a small distance deeper into the interior of the associated hydraulic cylinder. There is a communication port 50 establishing fluid communication between the interior of the innermost cylindrical portion of the cylinder arrangement and the diaphragm 55 which seals in the gas in chamber 14. When the wheel passes over the aforementioned bump, the piston is able to penetrate deeper into the piston, almost instantaneously, notwithstanding the relative incompressibility of the hydraulic fluid filling the cylinder interior, due to the fact that the gas in chamber 14 becomes compressed, permitting a limited flow of pressure fluid from above the piston 12 through the port 50 into the outermost annular fluid chamber. Of course, the gas pressure increases as its volume is reduced in this way, and accordingly the gas acts like a spring offering an increased opposing force in response to sudden penetration of the piston 12 deeper into the cylinder to due the passing of the associated vehicle wheel over a bump in the road. Opposing force is also afforded by the compression spring Z which increases the force pushing flanges 52 and 53 apart in response to such deeper penetration of the piston 12 into the hydraulic cylinder. Thus, the pneumatic spring and the compression spring cooperate. The exact characteristics of the shock absorber action will be discussed in somewhat greater detail with reference to FIGS. 2a and 2b.

As mentioned, the shock-absorber action is only one part of the operation of the illustrated arrangement, which also performs a regulation of the elevation of the associated end of the vehicle chassis.

The piston rod 2 is hollow, to permit the flow of pressure fluid, for example oil, therethrough. At the lower end of the hollow piston rod 2 is a one-way valve 10, which permits the flow of fluid through the piston rod 2 in upwards direction, as seen in the drawing. This inlet into the hollow piston rod 2 communicates via oil conduit 9 with the outlet of a pump 5, via an additional one-way valve 8.

At the upper end of piston rod 2 there is provided a passage communicating between the interior of piston rod 2 and the portion of the interior of the hydraulic cylinder above the piston 12. Normally this passage is closed by a valving body generally designated by reference numeral 4. Valving body 4 is hollow and receives the lower end of a rod 3. The lower end of rod 3 is widened, so that it cannot withdraw from the interior of valving body 4. Moreover, the valving body 4 contains a compression spring which normally biases the lower end of rod 3 downwards relative to valving body 4, so that normally the lower end of rod 3 is pushed by such compression spring to the bottom wall of valving body 4. The upper portion of valving body 4 is surrounded by an annular passage 11. However, with valving body 4 normally in its illustrated position, this annular passage 11 is thereby normally blocked, preventing the flow of fluid upwardly through the hollow piston rod 2 into the space above piston 12.

Piston 12 is provided with a pair of oppositely acting one-way valves, each comprised of a small valving member and a small biasing spring. Because these two one-way valves operate in opposite directions, it will be clear that the pressures above and below the piston 12 will become equal, in the steady-state operation of the device, except for a negligible steady-state pressure difference resulting from the fact that the threshold pressures for the two oppositely operating one-way valves have non-zero values, so that a pressure difference lower than such threshold value could exist above and below the piston 12 in the steady state. This pressure difference is negligible.

In the steady state, the hydraulic pressures above and below the piston 12 are almost exactly equal, and the net force exerted on the piston 12 is equal to the hydraulic pressure in the shock absorber 1 times the difference in working area of the upper and lower piston faces. This difference in working area is evidently equal to the cross-sectional area of the piston rod 2. Therefore, in the steady state, the hydraulic force pushing the piston 12 downwards is equal to the prevailing hydraulic pressure times the cross-sectional area of the piston rod 2.

At its upper end the illustrated hydraulic cylinder has an outlet 56 through which pressure fluid can leave the interior 13 of the cylinder. However, outlet 56 is normally closed by a valving body 17 mounted on the upper end of the aforementioned rod 3. Outlet 56 is additionally provided with a check valve 18, communicating with an outlet conduit 19 which leads to a fluid reservoir 7, via a pressure-responsive switch 20, an electromagnetic two-position valve 16 and a filter 22.

Specifically, component 20 is a pressure-responsive switch connected to the solenoid 36 of the electromagnetically actuated valve 16. When the pressure in outflow conduit 19 falls below a predetermined first value, switch 20 responds by connecting a voltage source 34 across the solenoid 36 of valve 16 via a connecting line 35, thereby energizing the solenoid and causing the valve 16 to move to its illustrated blocking position. On the other hand, if the pressure prevailing in outflow conduit 19 is above the aforementioned predetermined first value, then switch 20 does not connect voltage source 34 to solenoid 36, and accordingly, valve 16 will be in its other position, permitting the flow of fluid in either direction.

The hydraulic portion of the illustrated system furthermore includes a conduit communicating between the pump 5 and the reservoir 7, so that the pump can pump fluid out of the reservoir, an electric motor 6 for driving the pump, a safety valve 21 for shunting the output of the pump back to the reservoir if excessive pressures should develop for any reason, and a further pressure-detecting device 15 operative for detecting the pressure in oil supply line 9. Pressure-responsive switch 15 is operative for detecting when the pressure in oil supply line 9 exceeds a predetermined second value and thereupon terminates the operation of motor 6, in a manner to be described.

The chassis-elevation control system furthermore includes a chassis-elevation detector comprised of components 31-33. Components 32 and 33 are electrical contacts rigidly connected to the lower portion 52 of the illustrated unit, and thereby connected to the associated vehicle axle. Component 31 is also an electrical contact mounted on the outer surface of the illustrated unit. The showing is of course merely schematic. When piston 12 is positioned within the interior 13 of the cylinder unit in the position shown, contact 31 will bridge contacts 32 and 33. This is the position of the piston associated with the normally desired elevation for the associated end of the chassis. If the piston 12 moves from the illustrated position relative to the surrounding cylinder, the electrical engagement of contact 31 with both of contacts 32 and 33 ends, generating a signal in a manner to be described and for purposes to be described.

Figure 3:
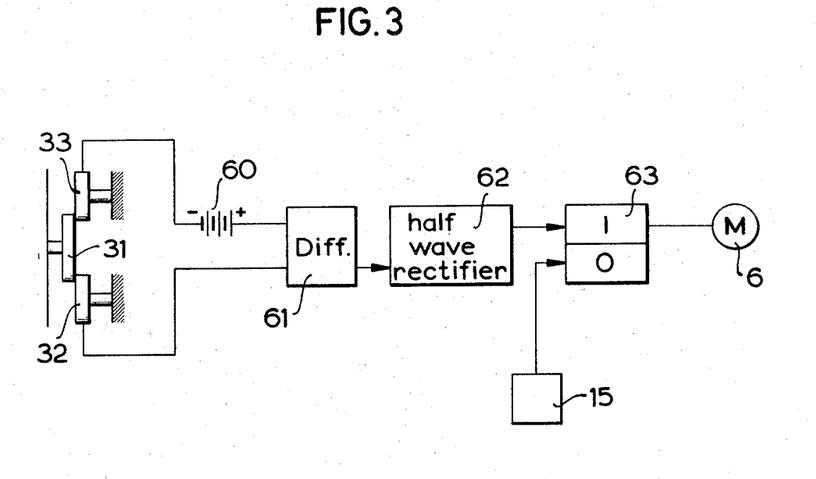
FIG. 3 illustrates an elementary control circuit forming part of the system shown in FIG. 1.

FIG. 3 shows, in schematic form, an elementary control circuit associated with the just-described electrical contacts 31, 32 and 33. When the piston is in its illustrated position relative to the cylinder, contact 31 bridges contacts 32 and 33, thereby applying the voltage furnished by a voltage source 60 to the input of a differentiator 61. With this constant voltage applied to the differentiator input, no signal appears at the differentiator output.

However, if the piston moves from its illustrated position, the electrical engagement between contacts 31-33 is broken, and the voltage furnished by voltage source 60 is no longer applied across the input of differentiator 61. This sudden decrease in the input voltage of differentiator 61 results in the generation of a steep voltage spike at the output of differentiator 61. This voltage spike is applied to a half-wave rectifier 62 having such a polarity as to pass only those voltage spikes which result from the breaking of the connection between contacts 31-33, while blocking those voltage spikes which result when such connection is re-established subsequently. The rectifier 62 accordingly passes the pulse which resulted when the piston left its illustrated position, and applies this pulse to the 1 input of a flip-flop 63. The 1 output of the flip-flop is connected to the electric motor 6 for the pump 5. Accordingly, when the piston leaves its illustrated position, the motor 6 for the pump 5 becomes activated. On the other hand, when the piston returns to its illustrated position, the motor 6 does not become de-activated, because there is no operative connection between the contacts 31-33 and the 0 input of flip-flop 63. Instead the pressure-responsive switch 15 is connected to the 0 input of flip-flop 63. When the pressure in the conduit 9 builds up to the threshold value of pressure-responsive switch 15, switch 15 applies a triggering signal to the 0 input of flip-flop 63, and it is as a result of this action that the pump motor 6 stops.

Figure 4:
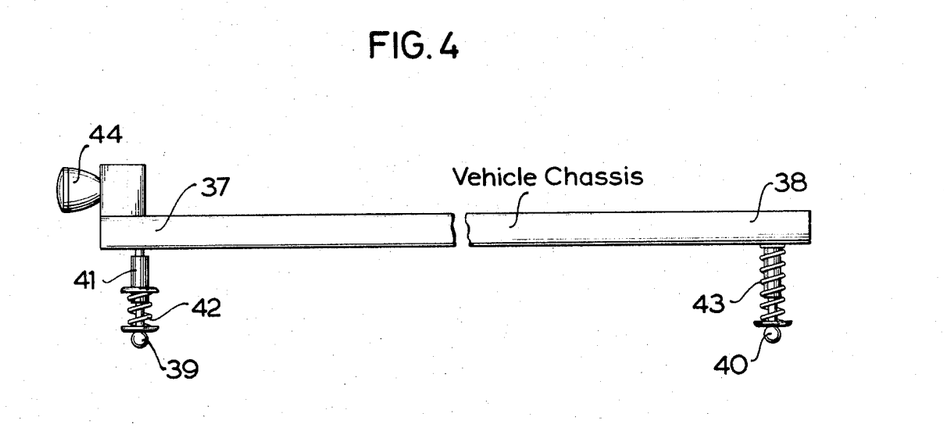
FIG. 4 is a highly schematic illustration of the mounting of the front and rear ends of the chassis of a vehicle relative to the front and rear axles of the vehicle.

FIG. 4, finally, illustrates in extremely schematic form the chassis of an automotive vehicle, with the chassis having a front end 37 positioned above a front axle 39 and a rear end 38 positioned above a rear axle 40. Front chassis end 37 is supported on front axle 39 by means of a unit 41, 42 corresponding to the unit 1 depicted in FIG. 1. That is, unit 41, 42 in FIG. 4 is comprised of a hydropneumatic shock absorber 41 including a supplementary shock absorber compression spring 42, and is furthermore comprised of the various hydraulic circuit components, and other mechanical components, illustrated in FIG. 1. In contrast, the rear end 38 of the chassis is supported above rear axle 40 by means of a simple resilient mounting means 43 comprised of a telescoping linkage and a compression spring surrounding the linkage. This showing has been made schematic, to facilitate understanding, and because the details of the connection between a vehicle chassis and a conventional resilient mounting means, is evidently a conventional matter.

The schematically depicted vehicle chassis 37, 38 furthermore includes a headlight 44.

The operation of the system, insofar as the system performs as a simple hydropneumatic shock absorber combined with a compression-spring shock absorber has already been described.

The operation of the system, insofar as it serves to regulate the elevation of one end of the chassis relative to the associated axle is as follows:

It is assumed that initially the piston 12 is in its illustrated position.

The vehicle becomes loaded, by reason of the entry of one or more passengers. As an immediate result, the sealed gas compartment 14 becomes compressed and the piston 12 penetrates deeper into the interior of its cylinder. As a result, rod 3 which cannot move any higher than its illustrated position, presses down against valving body 4. Therefore, as piston 12 moves upward, deeper into its cylinder, valve body 4 is prevented by rod 3 from sharing the upward movement of piston 12. As a result, the annular clearance 11 surrounding valve body 4 becomes unblocked, establishing an unblocked entrance into the space above piston 12.

As explained with reference to FIG. 3, when piston 12 leaves its illustrated position, electrical engagement between contacts 31, 32 and 33 is terminated, and this results in activation of the pump 5.

Accordingly the pump 5 pumps pressure fluid via inlet 9 and the hollow interior of piston rod 2 into the upper chamber of the cylinder. The pressure in this upper chamber increases and forces the piston 12 downwards. When the piston is pushed so far down that it resumes its illustrated position, the valving body 4 again closes off the annular entrance passage 11, and further entry of fluid into the space above piston 12 becomes impossible, notwithstanding the fact that pump 5 continues to operate. Of course, with annular entrance passage 11 again blocked, the pressure in inlet conduit 9 rapidly builds up to the threshold value of pressure-responsive switch 15. When that threshold pressure is reached, switch 15 turns off motor 6, and the chassis-elevation corrective action is terminated.

The situation is similar when the load decreases, for instance when one or more passengers leave the vehicle. The immediate result is that the piston 12 begins to withdraw out of its cylinder. Rod 3 moves down with piston 12 and valving body 4, thereby lowering valving body 17 and unblocking exit passage 56. Fluid immediately begins to leave the cylinder through exit passage 56. With the reduction in the volume of fluid confined above the piston 12, the piston 12 is free to move upwardly to regain its illustrated position. When the illustrated position of the piston is regained, the valving body 17 again closes off the flow of fluid out through exit passage 56. As a result, the pressure in the outflow conduit 19 decreases. When this pressure decreases to the threshold value associated with pressure-responsive switch 20, switch 20 applies the voltage of voltage source 34 to solenoid 36, and thereby causes two-position valve 16 to assume its illustrated blocking position.

Figure 2A:
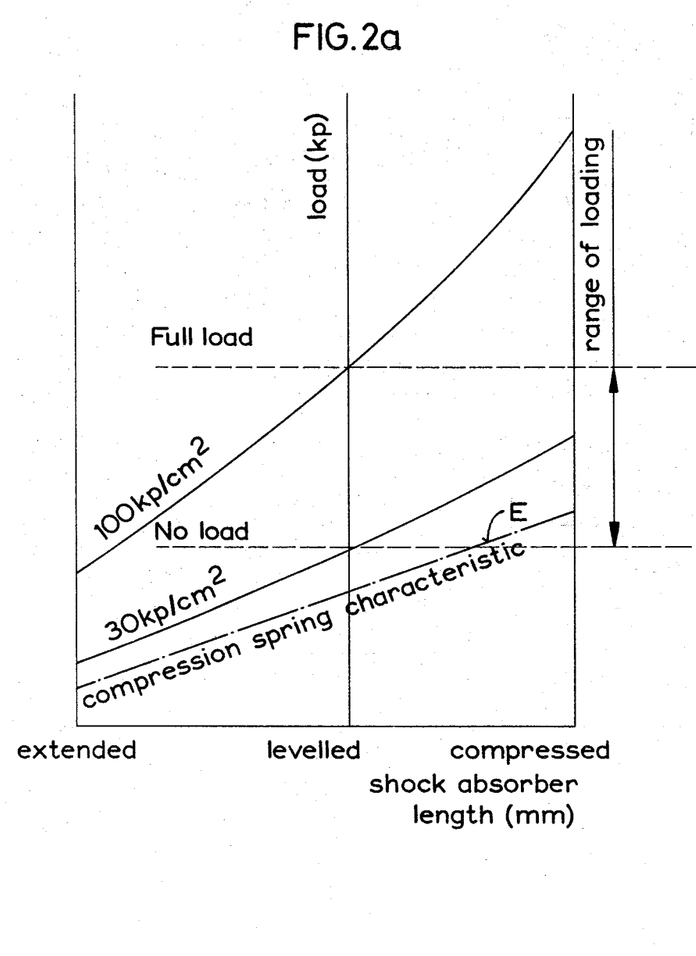
FIG. 2a is a graph of the shock absorber and elevation-regulation characteristics of a system similar to that shown in FIG. 1 but devoid of the inventive features.
Figure 2B:
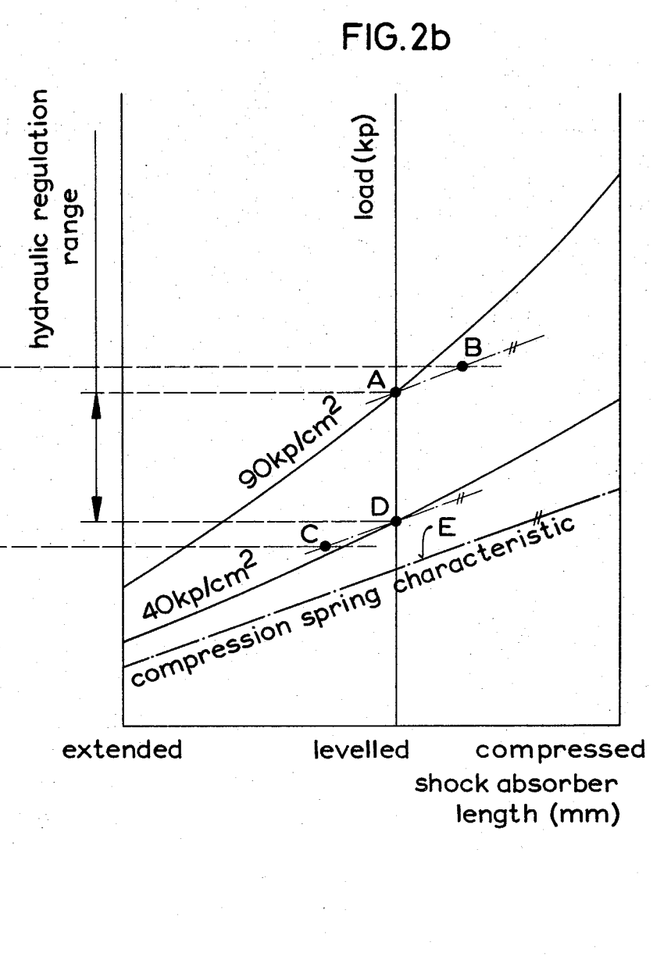
FIG. 2b is a graph of the shock absorber and elevation-regulation characteristics of the system shown in FIG. 1 and provided with the inventive features.

A more complete understanding of the invention can be had from a consideration of FIGS. 2a and 2b.

FIGS. 2a and 2b are graphs of the shock absorber and automatic elevation control characteristics of the illustrated system, but in two versions. The difference between the two versions lies exclusively in the choice of the threshold values for the pressure-responsive switches 15 and 20.

Plotted along the vertical axis is the total force which the shock absorber develops to resist the load. As will be understood, the force developed by the shock absorber is necessarily equal to the load force exerted upon the shock absorber, under conditions of force equilibrium which must prevail.

The horizontal line intersecting the vertical axis and designated "Full Load" indicates the maximum load, in kilopounds, which will be applied to the shock absorber during use. If used in a vehicle, this will be the maximum load that the shock absorber will be expected to withstand during use. The specific value of this maximum load of course depends upon the type of vehicle in question.

The horizontal line intersecting the vertical axis and designated "No Load" indicates the loading force, in kilopounds, which the shock absorber will have to resist if used in an unloaded vehicle. That is, this No Load loading force will correspond to the weight of a vehicle empty of passengers and cargo. Again, the specific value of the No Load loading force will depend upon the vehicle in question.

The double-headed arrow marked "range of loading" indicates the range of variation of the loading force applied to the shock absorber.

The horizontal axis is marked "shock absorber length (mm)." Plotted along the horizontal axis is the distance between portions 51 and 52 of the shock absorber, as seen in FIG. 1. A particular value on the horizontal axis is marked "levelled." This value is the distance between shock absorber portions 51 and 52 when piston 12 is in its illustrated position. The legend "compressed" refers to the shortening of the distance between the portions 51 and 52 in response to sudden short-lasting load increases, associated for example with bumps in the road surface, and with other factors to be described. The legend "extended" refers to the lengthening of the distance between the portions 51, 52 in response to sudden short-lasting load decreases, associated for example with depressions in the road surface, and with other factors to be described.

Curve E is a simple curve of spring force versus spring length for the compression spring Z in the arrangement of FIG. 1, considered separately from the remainder of the arrangement. As is usual with a compression spring, the spring becomes compressed as the loading force increases, and becomes extended as the loading force decreases. This is clear from the graph and easily understandable.

The two curves above curve E in FIG. 2a are likewise spring-characteristic graphs, but of the entire shock absorber shown in FIG. 1, including force components afforded by both the compression spring and hydropneumatic spring components of the shock absorbed, and taking into account the total distance between end portions 51, 52 of the shock absorber.

The two upper curves in FIGS. 2a are in fact the extreme members of a family or similarly shaped curves extending between these two curves. Each curve represents the shock-absorber characteristics of the entire shock absorber at the particular steady-state hydraulic pressure prevailing inside the hydraulic cylinder of the shock absorber. As was explained before, because of the automatic chassis-elevation control arrangement, the steady-state hydraulic pressure in the shock absorber will vary in dependence upon the weight of the chassis itself, plus the weight of passengers and cargo. This is ignoring the load fluctuations resulting from road irregularity.

The middle curve in FIG. 2a represent the shock absorber characteristics of the shock absorber of FIG. 1, when the vehicle is carrying no load and no passengers. To understand the meaning of this curve, imagine a driverless vehicle driving on a perfectly smooth road. Under these circumstances, the automatic chassis-elevation control arrangement will develop such a pressure within the hydraulic cylinder as to maintain the total length of the shock absorber at the length marked levelled in FIG. 2a, and thereby maintain the chassis elevation at a corresponding predetermined level. The total load-resisting force developed by the shock absorber is given by the intersection of the vertical line marked levelled with the no load line. The intersection of the curve E with the vertical line marked levelled indicates the component of the total load-resisting force attributable to compression spring Z; the remainder of this force is developed hydraulically within the hydraulic cylinder. It is assumed that the steady-state hydraulic pressure within the cylinder under these no-load circumstances is 30 kp/cm$^2$.

Now, imagine that this driverless (completely unloaded) vehicle moves off the ideally smooth road just mentioned onto a rough road having many bumps and holes. Shock absorber action will begin. As the associated vehicle wheel travels over the bumps and holes, this will produce sudden, very short-lasting load changes, which will produce sudden, short-lasting changes in the total shock-absorber length. The relationship between the instantaneous magnitude of the shock-absorber length and the instantaneous magnitude of the load, with a completely unloaded vehicle, is represented by the middle curve in FIG. 2a. This is the 30 kp/cm$^2$ curve, giving the shock absorber characteristics that the shock absorber will exhibit when travelling over bumps and holes, assuming that the steady-state hydraulic pressure developed in 30 kp/cm$^2$ on the smooth portions of the road.

It is to be understood that when the vehicle is completely unloaded, as just described, there will in fact be variations in the shock-absorber length, despite the provision of an automatic hydraulic distance-regulating arrangement. This is because the load variations due to travel on a rough road are so short-lasting that the position of piston 12 in FIG. 1 departs from its illustrated position for periods of time so short that the hydraulic distance-regulating arrangement does not have time to exert any appreciable distance-regulating corrective actions. The instantaneous value of the shock-absorber length will oscillate about the length marked levelled in FIG. 2a with a frequency too fast to elicit an appreciable response from the automatic hydraulic distance-regulating arrangement.

Imagine now that the vehicle is fully loaded; in a particular instance this may mean that an automobile is carrying six passengers and a trunk completely full of heavy luggage. This heavy loading of the vehicle causes the piston 12 to leave its illustrated position and penetrate deeper into its cylinder. The resulting significant departure from the levelled shock-absorber length, unlike the very short-lasting variations in shock-absorber length attributable to road bumps, lasts sufficiently long to give the hydraulic distance-regulating arrangement time enough to counteract this deviation and return the piston to its illustrated position, in the manner described above. The distance-regulating arrangement effects the return to the levelled position by developing in the hydraulic cylinder a predetermined pressure, assumed to be equal to 100 kp/cm$^2$ in the illustrated embodiment.

Now, the fully loaded vehicle, with a hydraulic pressure of 100 kp/cm$^2$ developed in its shock absorber, travels on a rough road. The bumps and holes in the road cause sudden and very short-lasting variations in the shock-absorber length. These variations are too short-lasting to be corrected by the automatic distance-regulating arrangement, because they end before the distance-regulating arrangement can have any appreciable effect. The relationship between the instantaneous shock-absorber length and the instantaneous load-resisting force developed by the shock absorber, when the steady-state hydraulic pressure is 100 kp/cm$^2$, is given by the uppermost curve in FIG. 2a.

It will be appreciated that, if the vehicle loading is intermediate full load and no load, the shock absorber characteristics of the arrangement, considered purely as a shock absorber, will be given by a graph lying intermediate the upper two graphs in FIG. 2a and associated with a steady-state hydraulic pressure intermediate 30 and 100 kp/cm$^2$. Thus, the upper two curves in FIG. 2a are the extreme members of a family of curves, with each curve of the family being a plot of shock-absorber opposing force versus shock-absorber length for a particular steady-state value of hydraulic pressure in the shock absorber.

To fully appreciate the meaning of the curves in FIG. 2a, one more consideration should be taken into account. Imagine that the vehicle provided with the shock absorber in question is standing still and is initially unloaded. Now, a load is added and the loading is gradually increased until the vehicle is fully loaded. Because the load is increased only gradually, the automatic hydraulic distance-regulating arrangement is able to establish a corrective regulation, and thus the shock absorber distance remains at the levelled value during this entire gradual increase of load. Furthermore, because the load is increased very gradually, nothing resembling the response to travel on a rough road arises, and therefore shock-absorber-type action is not produced. Accordingly, the curve representing this sequence of events will be that portion of the vertical line marked levelled located intermediate the horizontal lines marked full load and no load. In other words, the load-resisting force which the shock absorber develops during this gradual increase of the load rises with the load, but the only gradual increase of the load makes it possible to maintain the levelled distance during the entire increase of the load.

FIG. 2b, like FIG. 2a, represents the family of shock-absorber characteristic curves for different steady-state values of the hydraulic pressure developed within the hydraulic cylinder of an arrangement like that shown in FIG. 1. However, FIGS. 2a and 2b represent different versions of the arrangement shown in FIG. 1, the difference being in the threshold values associated with the two pressure-responsive switches 15 and 20. The importance of the selection of these threshold values will become clear from the following discussion.

In the version whose characteristics are shown in FIG. 2a, the threshold pressure for switch 20 is 15

$kp/cm^2$, while the threshold pressure for switch 15 is 120 $kp/cm^2$. The essential point to note is that the higher threshold pressure of 120 $kp/cm^2$ is above the hydraulic pressure (100 $kp/cm^2$) which must be developed in the cylinder to maintain the levelled position despite the application of the full load loading force. Also essential to note is that the lower threshold pressure of 15 $kp/cm^2$ is below the hydraulic pressure (30 $kp/cm^2$) which must be developed in the cylinder to maintain the levelled position when only the no load loading force must be resisted.

As a result, when the steady-state loading force varies between the no load value and the full load value, the steady-state shock-absorber length will always be equal to the indicated levelled value. This is because the pressure-responsive switch which turns off the pump motor does so only after the hydraulic pressure exceeds the value (100 $kp/cm^2$) associated with full load, and because the pressure-responsive switch which blocks the outflow conduit does so only after the pressure therein falls below the value (30 $kp/cm^2$) associated with no load.

The disadvantage of the arrangement shown in FIG. 2a is that under all steady-state driving conditions the end of the chassis provided with the elevation-regulating arrangement will always be at the same elevation. The other, unregulated end of the chassis, will evidently sink or rise as a result of addition or removal of steady-state loading force (i.e., force resulting from the weight of passengers plus cargo). When the loading force is great, it is evident that the regulated end of the chassis will be at a considerably higher elevation than the unregulated end of the chassis, which is very undesirable.

It is possible to employ the arrangement of FIG. 1 and yet significantly reduce this serious disadvantage, by appropriate selection of the threshold values for the pressure-responsive switches 15 and 20. In particular, it is contemplated to select threshold values within the range between 30 and 100 $kp/cm^2$—i.e., within the range of hydraulic pressures which must be developed in the shock absorber to develop a resisting force equal to the loading force for all loading-force values between no load and full load.

In the version of FIG. 1 whose characteristics are graphed in FIG. 2b, the threshold value of switch 15 is 90 $kp/cm^2$, and the threshold value of switch 20 is 40 $kp/cm^2$. These threshold values are clearly within the range of hydraulic pressures which must be developed in the shock absorber to develop a resisting force equal to the loading force for all loading conditions, i.e., for all loading-force values between no load and full load, if the levelled shock-absorber length is to be preserved.

The results of this selection of threshold values become evident from a consideration of the resulting shock absorber characteristics graphed in FIG. 2b.

Insofar as the meaning of the curves shown in FIG. 2b is the same as the meaning of those shown in FIG. 2a, such meaning will not be explained again.

First, assume that the vehicle provided with the system of FIG. 2b is at a standstill, so that shock absorber action can initially be ignored, with only the automatic chassis-elevation regulating operation being considered. Assume that the vehicle is loaded to such an extent that the automatic regulating system must develop in the shock-absorber cylinder a hydraulic pressure of 40 $kp/cm^2$ in order to maintain the shock-absorber length at the levelled value. The loading force corresponding to such steady-state shock-absorber hydraulic pressure will be equal to D, in FIG. 2b.

Next, imagine that the total loading force on the shock absorber of the stationary vehicle rises very gradually from D to A. This gradual rise of the loading force will result in no substantial deviations from the levelled shock-absorber length, because the hydraulic regulating system will be able to maintain the levelled length by gradually increasing the shock-absorber hydraulic pressure from 40 $kp/cm^2$ to 90 $kp/cm^2$—exactly as was the case with the system whose characteristics are shown in FIG. 2a.

The difference resides in what happens if the loading force on the shock absorber is increased further from A up to the maximum value of B.

If the steady-state loading force rises gradually towards A, the hydraulic pressure in the shock absorber cylinder will rise gradually to 90 $kp/cm^2$, as already mentioned several times. If the loading force rises above A, the shock absorber must somehow respond by developing an additional resisting force. However, it cannot do so by increasing the hydraulic pressure in the shock absorber cylinder, because switch 15 terminates operation of pump motor 6 as soon as the pressure in supply conduit 9 reaches or exceeds 90 $kp/cm^2$. A further increase of hydraulic pressure in the shock absorber cylinder is therefore not available. The additional resisting force must somehow be developed, and this can only be accomplished by the shock-absorber spring Z. As is clear, the resisting force developed by spring Z can increase only at the expense of spring compression. Therefore, as the loading force rises from A to B, the shock absorber resisting force rises similarly, but the compression spring Z which supplies the additional resisting force becomes more compressed. A consideration of FIG. 1 makes it evident that the piston 12 cannot be maintained in its illustrated position if the compression spring Z is compressed more than illustrated in the drawing. Accordingly, the levelled shock-absorber length can no longer be maintained, and the shock absorber will become compressed, as the loading force increases from A to B. This is illustrated in FIG. 2b by the dashed curve extending from A to B. It will be noticed that this dashed curve is parallel to curve E, which represents the length versus opposing-force characteristics of the spring Z.

As stated above, when the steady-state loading force is increased from D to A, the shock-absorber opposing force will also increase from D to A. However, this increase in shock-absorber opposing force results solely from the increased hydraulic pressure in the hydraulic cylinder. Clearly, if the rise in loading force from D to A is gradual, the levelled shock-absorber length will be maintained, and the spring force will not change as the loading force is increased from D to A. On the other hand, as the loading force rises further from A to B, the increased opposing force developed by the shock absorber is now due exclusively to increased spring force and not at all due to increased hydraulic force.

A similar situation prevails if the steady-state loading force decreases below D. When the steady-state loading force decreases below D, the steady-state hydraulic pressure in the shock-absorber cylinder necessary to oppose the loading force without loss of the levelled position will fall below 40 $kp/cm^2$. However, as soon as the pressure in outflow conduit 19 falls below 40 kp/cm², switch 16 activates valve 16 to block the outflow conduit 19, preventing any further decrease in the pressure inside the cylinder of the shock absorber. Nevertheless, if the loading force decreases below D, down to C, the opposing force developed by the shock absorber must decrease similarly. Since a decrease in the hydraulic pressure in the shock-absorber cylinder is now not possible, a decrease in the total opposing force developed by the shock absorber can only result from a lengthening of the compression spring Z. Therefore, as the steady-state loading force decreases from D down to C, the shock-absorber length will leave the levelled value and will increase, as is evident in the drawing. The dashed-line curve extending between points C and D in FIG. 2b is indicative of the relationship between the steady-state shock-absorber length and the steady-state loading force which the shock absorber must oppose.

A comparison should now be made between FIGS. 2a and 2b. With the system whose characteristics are shown in FIG. 2a, the steady-state shock-absorber length is maintained at the levelled value for all loading forces between no load and full load. In FIG. 2b, the steady-state shock-absorber length is maintained at the levelled value for all loading forces between D and A—i.e. for all loading forces requiring the development of a hydraulic pressure in the shock absorber cylinder between the pressure limits established by pressure-responsive switches 15 and 20.

It is particularly useful to consider what happens with the system of FIG. 2b as the steady-state loading force applied to the shock absorber rises from value C to value B.

As the loading force rises from no load value C to value D, the shock-absorber length will decrease, and the associated end of the vehicle chassis will become lowered, and not be maintained at a fixed elevation. During this increase of loading force, it is assumed that the elevation of the other end of the vehicle chassis, which elevation is not automatically regulated, will also decrease. Accordingly, for the range of loading forces between C and D, the elevation of both ends of the chassis will decrease, giving rise to no great discrepancies in the two elevations.

Now, let the steady-state loading force increase from D to A. Within this range of loading force values, the automatic hydraulic regulating arrangement is in operation, and the steady-state shock-absorber length will be maintained at the levelled value. Inasmuch as the elevation of the other end of the vehicle chassis is not similarly regulated, a discrepancy in the elevations of the two ends of the chassis will begin to develop, and will increase as the loading force rises from D to A.

Next, as the loading force rises from A to B, the shock-absorber length again decreases in correspondence to the increase of loading force. Accordingly, the discrepancy existing between the steady-state elevations of the two chassis ends will not increase substantially in response to this further increase of the steady-state loading force exerted upon the shock absorber.

It will be appreciated by those skilled in the art that the characteristics depicted in FIG. 2b represent a compromise between pure chassis-elevation regulation and a complete lack of chassis-elevation regulation. This compromise is extremely desirable, because it makes it possible to enjoy the benefits of automatic chassis-elevation regulation through the regulation of the elevation of only one of the two ends of the chassis, without incurring excessive discrepancies between the regulated elevation and the unregulated elevation, and certainly not to the extent that this disadvantage is incurred with the system of FIG. 2a.

In the illustrated embodiment it was explained that the threshold pressure (90 kp/cm²) of the switch 15 was selected below the hydraulic pressure (100 kp/cm²) which would have to be developed in the shock-absorber cylinder if the full load loading force were to be counteracted while maintaining the shock-absorber length at the levelled value. Likewise it was indicated that the threshold pressure (40 kp/cm²) of the switch 20 was selected above the hydraulic pressure (30 kp/cm²) which would have to be developed in the shock-absorbed cylinder if the no load loading force were to be counteracted while maintaining the shock-absorber length at the levelled value.

However, it is contemplated according to the invention to thusly select the threshold pressure of only one of the two pressure-responsive switches 15, 20. Using the numerical values in the disclosed example, the threshold value of switch 15 could be below 100 kp/cm² while the threshold value of switch 20 could be below 30 kp/cm². Conversely, according to the invention, the threshold pressure of switch 20 could be above 30 kp/cm² while the threshold pressure of switch 15 could be above 100 kp/cm². The benefits of chassis-elevation regulation through regulation of the elevation of only one of the two ends of the chassis could still be enjoyed, while still avoiding to a great degree the disadvantage of the development of excessive discrepancies between the regulated and unregulated chassis end elevations.

In particular, it is considered advantageous to set only the switch 20 to a value inside the range of hydraulic pressures which would have to be established in the shock-absorber cylinder if all values of the loading force between no load and full load were to be resisted while maintaining the shock-absorber length at the levelled value. With such an approach, the initial increase of loading force from the no load value at C to the light-load value at D, would not involve the automatic level-regulating arrangement at all, and would only involve the spring Z of the shock absorber. Accordingly, the steady state position for this range of load values would be achieved almost immediately, since no build up of pressure fluid or equalization of pressure in the two cylinder chambers would be associated with this range of loading forces.

The exemplary embodiment disclosed herein made use of a hydraulic cylinder-and-piston unit having one end connected to a vehicle chassis and an other end connected to a vehicle axle, in such a manner that lowering of the chassis relative to the axle resulted in a shortening of the length of the hydraulic cylinder-and-piston unit. However, it would also be possible according to the invention to employ a hydraulic cylinder-and-piston unit so connecting the chassis and axle that lowering of the chassis relative to the axle, due to an increase of loading force, would result in an elongation of the cylinder and piston unit. This would occur, for example, if the cylinder were connected to the chassis at a point lower than the point at which the piston is connected to the axle. In that event the illustrated compression spring could be replaced by a tension spring.

It will be understood that each of the elements described above, or two or more together, may also find a useful application in other types of circuits and constructions differing from the types described above.

While the invention has been illustrated and described as embodied in an automatic distance-regulating arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a distance-regulating arrangement for controlling the spacing between two components that are to be subjected to varying forces tending to change the spacing between the components, particularly for controlling the spacing between an axle and the chassis of a vehicle subjected to varying weight forces, in combination, linkage means for connecting together said two components and including a first portion connectable to one of said two components and a second portion connectable to the other of said two components and movable relative to said first portion of said linkage means in a predetermined direction, said linkage means being subjected to a loading force varying between a lower limit and an upper limit; detecting means operative for detecting whether the loading force applied to said linkage means is in a first range bounded by said lower limit and by a predetermined first value greater than said lower limit, in a second range bounded by said first value and by a predetermined second value greater than said first value but lower than said upper limit, or in a predetermined third range bounded by said second value and by said upper limit; and control means operative when said loading force is in said second range for automatically restoring said distance to a predetermined normal value when said distance departs from said normal value but operative when said loading force is in either one of said first and third ranges for automatically changing said distance as a predetermined function of the magnitude of said loading force.

2. An arrangement as defined in claim 1, wherein said linkage means comprises a hydraulic cylinder and piston unit including a hydraulic cylinder constituting said first portion and a hydraulic piston constituting said second portion, and wherein said control means comprises hydraulic means automatically operative for increasing and decreasing the pressure of hydraulic fluid in said cylinder to apply to said hydraulic piston a hydraulic force resisting the effect of said loading force, but only when said loading force is intermediate said first and second values.

3. An arrangement as defined in claim 2, wherein said control means further includes spring means connected to said first and second portions and operative for resisting said loading force.

4. An arrangement as defined in claim 2, wherein said control means further includes spring means so connected to said first and second portions as to supplement the hydraulic force exerted upon said hydraulic cylinder by said hydraulic means when said loading force is intermediate said first and second values.

5. An arrangement as defined in claim 4, wherein said piston divides the interior of said cylinder into two axially spaced chambers, and wherein said piston is provided with a piston rod connected to one axial end of said piston, with the other axial end of said piston having a larger area exposed to pressurized hydraulic fluid than does said one axial end thereof, and wherein said hydraulic means comprises a pump communicating with the interior of said cylinder and operative for pumping pressure fluid into said cylinder to increase the pressure of fluid in said cylinder, and outlet valve means communicating with the interior of said cylinder and operative when actuated for permitting the flow of pressure fluid out of said cylinder to decrease the pressure of fluid in said cylinder, and wherein said hydraulic means further includes first pressure-responsive means operative for preventing the flow of fluid out of said cylinder through said outlet valve means when the pressure of fluid in said cylinder falls below the pressure required to maintain said distance at said normal value under a loading force having said first value, and second pressure-responsive means operative for preventing further increase of pressure in said cylinder when the pressure in said cylinder exceeds the value required to maintain said predetermined distance between said portions under a loading force having said second value.

6. An arrangement as defined in claim 5, wherein said second pressure-responsive means comprises means operative for terminating operation of said pump means when the pressure in said cylinder exceeds the value required to maintain said predetermined distance between said portions under a loading force having said second value.

7. An arrangement as defined in claim 5, wherein said hydraulic means further comprises an outlet conduit communicating with the interior of said cylinder and controlled by said outlet valve means, and wherein said first pressure-responsive means comprises means operative for blocking said outlet conduit at a portion thereof downstream of said outlet valve means when the pressure in said outlet conduit falls below the cylinder pressure required to maintain said predetermined distance between said portions under a loading force having said first value.

8. An arrangement as defined in claim 1, wherein said control means comprises spring means connected to said first and second portions and operative for resisting the loading force for all values of said loading force intermediate said lower and upper limits, and further includes hydraulic means automatically operative for supplementing the resisting force afforded by said spring means and furthermore automatically operative only when said loading force is intermediate said first and second values for maintaining substantially constant the distance between said first and second portions.

9. In combination with a vehicle having a wheel axle and a chassis, a distance-regulating arrangement for controlling the spacing between said wheel axle and said chassis in response to weight forces, comprising linkage means including a first portion connected to said chassis and a second portion connected to said axle and movable relative to said first portion of said linkage means in a predetermined direction, said linkage means being subjected to a varying load force which varies between a lower limit and an upper limit; detecting means operative for detecting whether the loading force applied to said linkage means is in a first range bounded by said lower limit and by a predetermined first value greater than said lower limit, in a second range bounded by said first value and by a predetermined second value greater than said first value but lower than said upper limit, or in a third range bounded by said second value and by said upper limit; and control means operative when said loading force is in said second range for automatically restoring said distance to a predetermined normal value when said distance deviates from said normal value but operative when said loading force is in either one of said first and third ranges for automatically changing said distance as a predetermined function of the magnitude of said loading force.

10. In a vehicle comprised of a chassis having a first end and a second end, a first axle arrangement at said first end and a second axle arrangement at said second end, and a mounting arrangement for mounting said first end of said chassis on said first axle arrangement and said second end of said chassis on said second axle arrangement, the mounting arrangement being of the type operative for automatically regulating the spacing between said first end of said chassis and said first axle arrangement by restoring said spacing to a predetermined value when due to a change in loading force said spacing deviates from said value but without similarly regulating the spacing between said second end of said chassis and said second axle arrangement, so as to cause the possibility of discrepancies between the elevation of the first end of said chassis and the elevation of the second end of said chassis, the improvement residing in the fact that the mounting arrangement comprises linkage means including a first portion connected to said first end of said chassis and including a second portion connected to said first axle arrangement and movable relative to said first portion of said linkage means in a predetermined direction, said linkage means being subjected to a loading force varying between a lower limit corresponding to the absence of passengers and cargo in said vehicle and an upper limit corresponding to full loading of the vehicle; detecting means operative for detecting when the loading force applied to said linkage means is in a predetermined first range bounded by said lower limit and by a predetermined first value greater than said lower limit, in a predetermined second range bounded by said first value and by a predetermined second value greater than said first value but lower than said upper limit, or in a predetermined third range bounded by said second value and by said upper limit; and control means operative when said loading force is in one of said first and third ranges for causing the distance between said portions to vary as a predetermined function of said loading force within a range of values above a predetermined normal value of said distance, operative when said loading force is in the other one of said first and third ranges for causing said distance to vary as a predetermined function of said loading force within a range of values of said distance below said normal value, and operative when said loading force is in said second range for automatically restoring said distance to said normal value when said distance deviates from said normal value.

11. In combination with a vehicle having a wheel axle and a chassis, a distance-regulating arrangement for controlling the spacing between said wheel axle and said chassis, comprising linkage means including a first portion connected to said chassis and a second portion connected to said axle and movable relative to said first portion of said linkage means in a predetermined direction, said linkage means being subjected to a loading force which varies between a lower limit corresponding to the absence of passengers and cargo in said vehicle and an upper limit corresponding to full loading of the vehicle; detecting means operative for determining whether the magnitude of the loading force lies within a first range bounded by said lower limit and by a predetermined intermediate value intermediate said lower limit and said upper limit, or in a second range bounded by said intermediate value and by said upper limit; and control means operative when the magnitude of the loading force lies within said first range for automatically changing the distance between said portions as a predetermined function of the magnitude of the loading force but operative when the magnitude of the loading force lies within said second range for automatically restoring said distance to a predetermined normal value when said distance deviates from said normal value.

12. In combination with a vehicle having a wheel axle and a chassis, a distance-regulating arrangement for controlling the spacing between said wheel axle and said chassis, comprising linkage means including a first portion connected to said chassis and a second portion connected to said axle and movable relative to said first portion of said linkage means in a predetermined direction, said linkage means being subjected to a loading force which varies between a lower limit corresponding to the absence of passengers and cargo in said vehicle and an upper limit corresponding to full loading of the vehicle; detecting means operative for determining whether the magnitude of the loading force lies within the first range bounded by a first intermediate value intermediate said lower limit and said upper limit and by a second intermediate value intermediate said first intermediate value and said upper limit, or within a second range intermediate said second intermediate value and said upper limit; and control means operative when the magnitude of the loading force lies within said second range for automatically changing the distance between said portions as a predetermined function of the magnitude of the loading force and operative when the magnitude of the loading force lies within said first range for automatically restoring said distance to a predetermined normal value when said distance deviates from said normal value.

13. In a vehicle comprised of a chassis having a first end and a second end, a first axle arrangement at said first end and a second axle arrangement at said second end, and a mounting arrangement for mounting said first end of said chassis on said first axle arrangement and said second end of said chassis on said second axle arrangement, the mounting arrangement being of the type operative for automatically regulating the spacing between said first end of said chassis and said first axle arrangement by restoring said spacing to a predetermined value when due to a change in loading force said spacing deviates from said value but without similarly regulating the spacing between said second end of said chassis and said second axle arrangement, the improvement residing in the fact that the mounting arrangement comprises a variable-length hydraulic cylinder-and-piston linkage unit having a first portion connected to said first axle arrangement and a second portion connected to said first end of said chassis, said linkage unit being subjected to a weight loading force varying between a lower limit corresponding to the absence of passengers and cargo in said vehicle and an upper limit corresponding to full loading of the vehicle; a working fluid reservoir; a pump having an inlet connected to said reservoir and having an outlet; a first conduit connecting the outlet of said reservoir to the interior of said hydraulic linkage unit; a second conduit connecting the interior of said hydraulic linkage unit to said reservoir; means operative, when the distance between said first and second portions of said linkage unit deviates in a predetermined direction from a preselected normal value, for automatically restoring said distance to said normal value by causing said pump to pump working fluid from said reservoir through said first conduit into the interior of said linkage unit; means operative for automatically terminating the pumping of working fluid through said first conduit into the interior of said linkage unit when the pressure of working fluid being pumped into the interior of said linkage unit exceeds a predetermined pressure corresponding to a loading force having a predetermined first value greater than said lower limit; means operative when the distance between said first and second portions of said linkage unit deviates in the opposite direction from said normal value for automatically restoring said distance to said normal value by automatically causing working fluid to flow from the interior of said linkage unit into said reservoir through said second conduit; means operative for automatically terminating the flow of working fluid out from the interior of said linkage unit into said reservoir through said second conduit when the pressure of working fluid in said second conduit falls below a predetermined pressure corresponding to a loading force having a predetermined second value greater than said first value but less than said upper limit; and auxiliary mechanical spring means connecting together said first and second portions of said linkage unit and operative for supplementing the resisting force developed by said hydraulic linkage unit when the loading force applied to said linkage unit has a value intermediate said lower limit and said first value and also when the loading force applied to said linkage unit has a value intermediate said second value and said upper limit.

* * * * *